Nov. 30, 1954   F. E. BACHMAN ET AL   2,695,686
WHEEL AND OFF WHEEL BRAKE
Filed Jan. 7, 1950   3 Sheets-Sheet 1
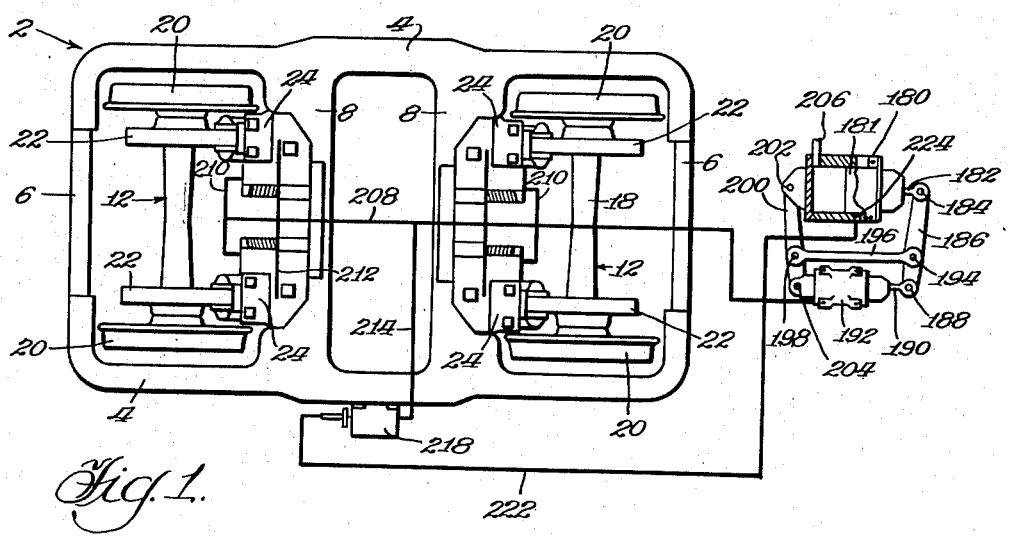
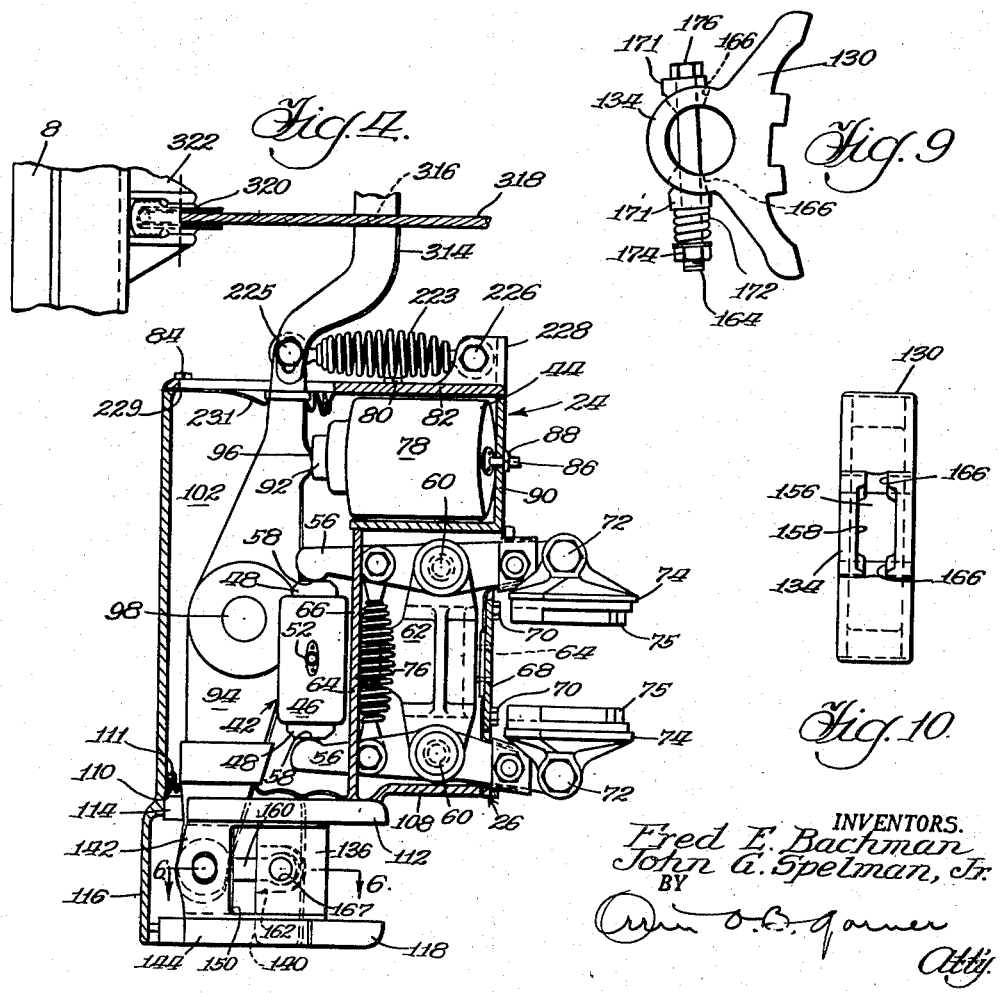
INVENTORS.
Fred E. Bachman
John G. Spelman, Jr.
BY
Arun O. B. Garner
Atty.

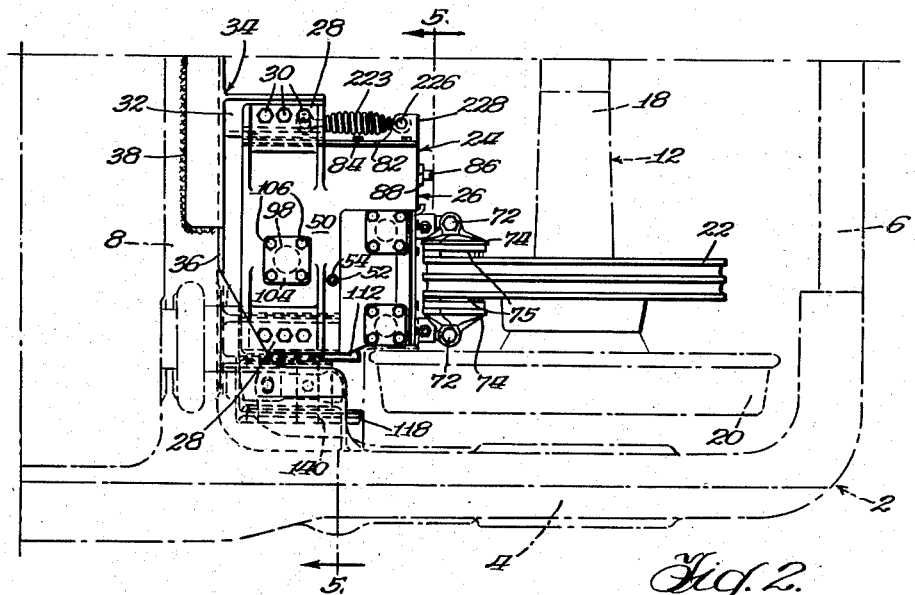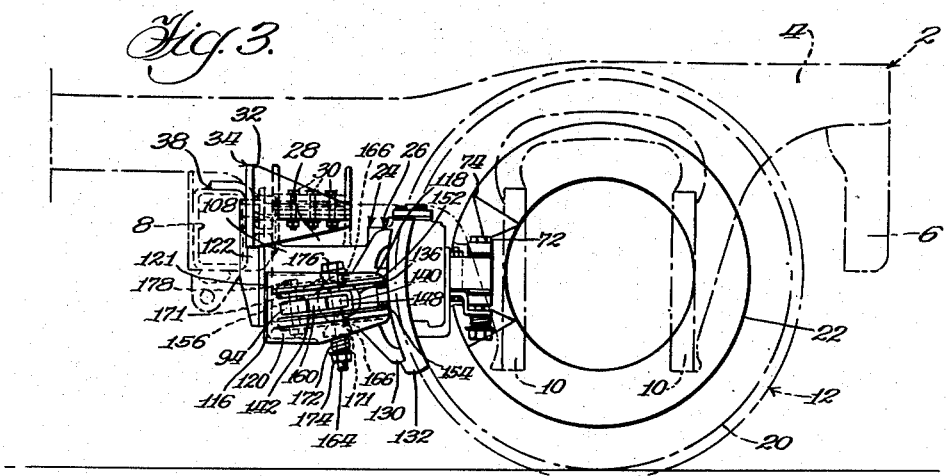

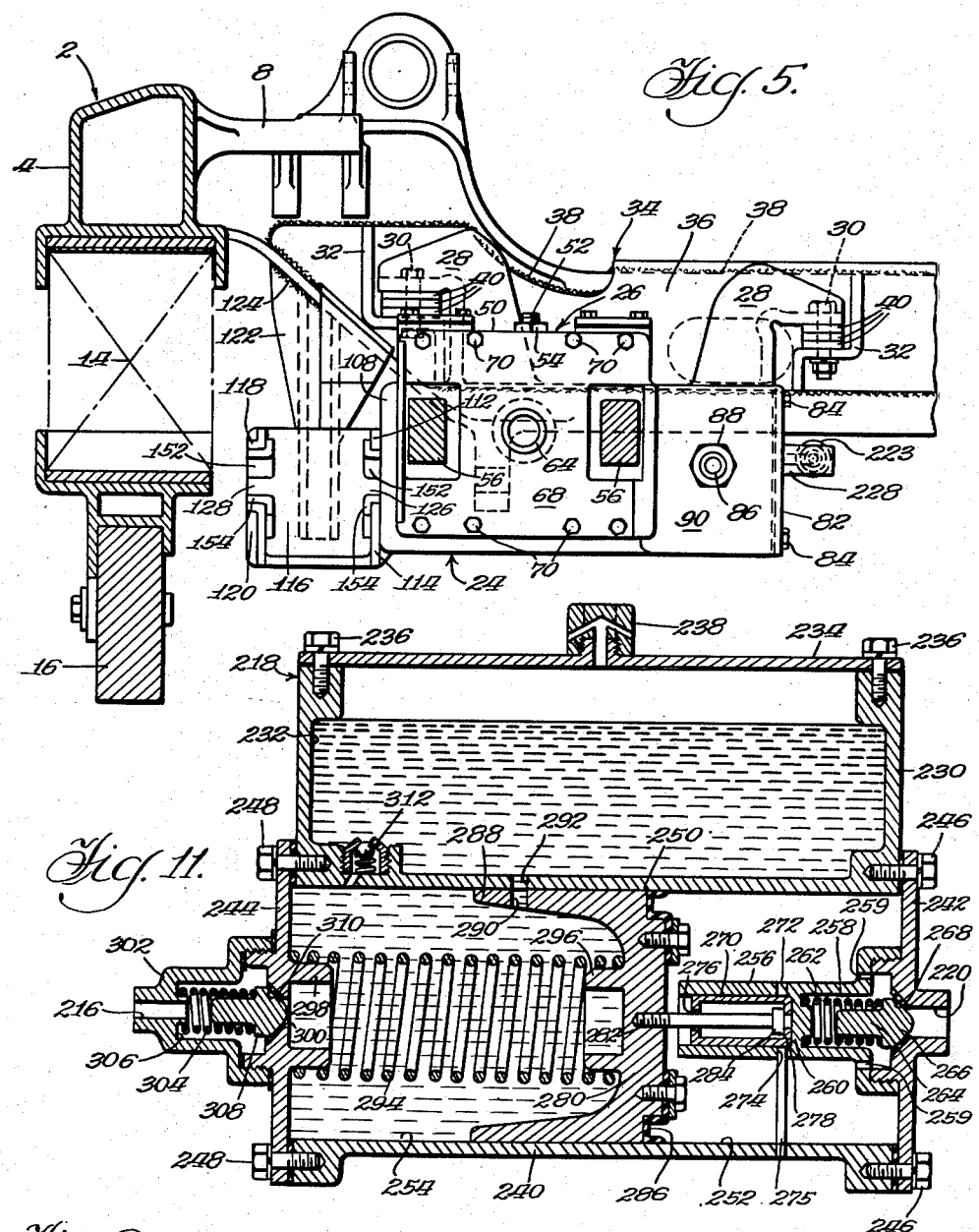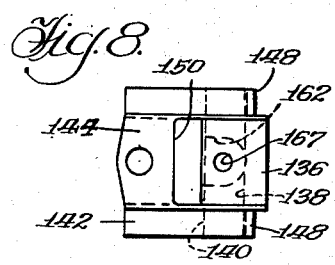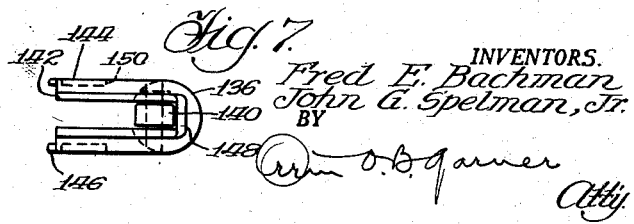

United States Patent Office 2,695,686
Patented Nov. 30, 1954

2,695,686

WHEEL AND OFF WHEEL BRAKE

Fred E. Bachman and John G. Spelman, Jr., St. Louis, Mo., assignors to American Steel Foundries, Chicago, Ill., a corporation of New Jersey Application January 7, 1950, Serial No. 137,454

9 Claims. (Cl. 188—153)

This invention relates to railway brake equipment and more particularly to a type incorporating wheel tread brakes and off wheel brakes in combination.

A general object of the invention is to provide a novel railway brake in which the braking action is distributed between the tread surfaces of the wheels of an associated wheel and axle assembly and one or more disks carried by the assembly, wherein the wheel tread shoes may have metal-to-metal braking action and the off wheel shoes may be formed of composition material, thereby affording a more uniform braking action under all speeds.

The primary object of the invention is to provide a package unit which may be quickly and conveniently mounted on a standard truck frame or removed therefrom as a unit and which may contain wheel brake means and off wheel brake means.

A further object is to utilize hydraulic means to actuate the wheel brake means and the off wheel brake means to provide a compact package assembly which may be readily accommodated in the confined space in a conventional car truck.

A further object is to provide a brake arrangement incorporating a hydraulic system for actuating the brake means to obtain increased braking pressures, the hydraulic system being operated with the conventional railway car pneumatic system.

The invention contemplates the provision of a novel slack adjusted in the hydraulic system which will compensate for wear of the parts.

A further object of the invention is to provide a novel arrangement for guiding and supporting the shoes which engage the wheels.

An additional object of the invention is to provide a novel handbrake arrangement for operating the wheel brake means.

A still further object of the invention is to provide a combination brake wherein the wheel brake means and the off wheel brake means are actuated by independent power means which in turn are actuated by a common power device.

These and other objects of the invention will become more apparent from the specification and the drawings, wherein:

Figure 1 is a top plan view of a railway car truck incorporating the invention and including a schematic diagram of the hydraulic and pneumatic systems;

Figure 2 is an enlarged top plan view of the lower right-hand corner of the truck structure shown in Figure 1;

Figure 3 is a side elevational view of Figure 2;

Figure 4 is a horizontal sectional view of the brake mechanism shown in Figures 2 and 3;

Figure 5 is a sectional view taken on the line 5—5 of Figure 2;

Figure 6 is a sectional view taken on the line 6—6 of Figure 4;

Figure 7 is a side elevational view of the structure shown in Figure 6 with the connecting link removed;

Figure 8 is a top plan view of the structure shown in Figure 7;

Figure 9 is a side elevational view of the head with the friction device applied thereto;

Figure 10 is a rear view of the head; and

Figure 11 is a longitudinal sectional view of the slack adjuster.

In certain views parts may be omitted where more clearly shown in others.

Describing the invention in detail, the truck comprises a frame generally indicated 2 including spaced side rails 4, 4 interconnected at their ends by end rails 6, 6 and intermediate their ends by spaced transoms 8, 8, the transoms affording a support for a car body supporting bolster (not shown) in the usual manner, as will be readily understood by those skilled in the art. Each side rail 4 comprises spaced pedestals 10, 10 at each end thereof to accommodate a journal box (not shown) of a wheel and axle assembly 12. The frame 2 is supported by springs 14 (Figure 5) from an equalizer 16, the ends of which are seated in conventional manner on the journal boxes (not shown) on the wheel and axle assemblies. Each wheel and axle assembly 12 includes an axle 18 and spaced wheels 20, 20. Each wheel and axle assembly carries a brake disk 22 preferably adjacent each wheel 20 inboardly thereof.

A package brake structure generally designated 24 is mounted adjacent each disk 22 from the adjacent transom. Each brake structure 24 comprises a housing 26 from the top of which project a pair of torque lugs 28, 28 connected as by bolts 30, 30 to torque arms 32, 32 of a U-shaped yoke 34. The yoke 34 comprises a mounting portion 36 interconnecting the arms 32, 32 and connected to the adjacent transom 8 as by welding at 38, 38. Spacers 40, 40 are preferably disposed between each lug 28 and arm 32 to adjust the height of the brake structure as the wheels wear.

Each housing 26 carries power devices 42 and 44. The power device 42 is a double-acting type and comprises a cylinder 46 and a piston 48 extending from each end thereof. The power device 42 is connected in any convenient manner to the top wall 50 of the housing as by a fluid conduit or pipe 52 connected to the cylinder 46 and extending through the top wall 50 of the housing and connected thereto as by a nut 54. The power device 42 extends between the inner ends of a pair of generally horizontally disposed brake levers 56, 56 which extend through the forward side of the housing. Each piston 48 may engage the adjacent lever 56 as at 58. The levers 56, 56 may be pivoted by pins 60 intermediate their ends to opposite ends of a fulcrum block 62 and the fulcrum block may be pivoted as at 64, 64 to a wall 66 of the housing and a cover plate 68 connected to the forward side of the housing as by bolts 70. The outer ends of the levers 56 pivotally carry on bolt 72 brake head and shoe assemblies 74, including composition brake shoes 75, arranged to engage the opposite sides of the associated disk or rotor 22. A release spring 76 is connected between the levers 56, 56.

The power device 44 is mounted within the housing 26 inboardly of the power device 42 and comprises a cylinder 78 which may be connected as by bolts 80 to a cover plate 82 connected as by bolts 84 to the inboard side of the housing 26. A fluid conduit 86 extends from one end of the cylinder 78 and is connected as by a nut 88 to a forward wall 90 of the housing. A piston 92 extends from the other end of the cylinder 78 and is arranged to actuate a generally horizontally disposed lever 94. The piston 92 engages the lever 94 as at 96 adjacent the inner end thereof. The lever 94 is pivoted intermediate its ends on a generally vertical pin 98 which is journaled to top and bottom walls 50 and 102 of the housing 26, the pin 98 being retained in position by a cap 104 which is secured to the top wall 50 of the housing as by bolts 106, 106. The lever 94 extends at its outboard end outboardly of an outboard wall 108 of the housing through an opening 110 therein into a brake head guide provided at the outboard side of the housing, the opening being sealed by a flexible dust cover 111 which extends across the opening and is fastened to the lever.

The guide comprises spaced inboard and outboard jaws, the inboard jaw being formed integral with the outboard side of the outboard wall of the housing and comprising spaced top and bottom jaw members 112 and 114 which extend forwardly of a rear wall 116 of the housing and are connected thereto. The rear wall 116 of the housing is extended outboardly of the inboard jaw and is connected to forwardly extending spaced top and bottom jaw members 118 and 120 of the outboard jaw. The rear side of the part of wall 116 which extends outboardly of the housing 26 is slidably seated as at 121 against the lower end of a torque arm 122, the upper end of which is connected to the adjacent transom as by welding at 124. The jaw members of the inboard and outboard guides define slots 126 and 128 therebetween, respectively, said slots being aligned transversely of the truck and extending longitudinally radially with respect to the axis of the adjacent wheel and axle assembly.

A brake head 130 is disposed generally vertically between the inboard and outboard jaws of the guide in alignment with the adjacent wheel. The head carries a preferably cast iron shoe 132 in conventional manner on its forward side. The head is provided on its rear side with a hub 134 having a cylindrical opening within which is disposed a bearing 136 in complementary cylindrical face engagement with the hub to accommodate rotation of the head to adjust the shoe against the wheel. The bearing is provided with a substantially rectangular opening 138 extending open to the rear of the head. A bar 140, rectangular in cross section, extends complementally within the opening 138 in the bearing 136 through the opening in the hub 134. The opposite ends of the bar 140 project beyond the inboard and outboard sides of the head and are received within a U-shaped wear plate 142.

The wear plate 142 comprises top and bottom portions 144 and 146 interconnected by forward portions 148, 148. The wear plate 142 is bifurcated at its forward end as at 150 to accommodate the brake head therein. The inboard and outboard edges of the top and bottom portions 144 and 146 of the wear plate extend into the slots 126 and 128, respectively. The top portion 144 is adapted to engage wear plates 152, 152 mounted on the bottom and adjacent sides of the top jaw members 112 and 118, and the bottom portion 146 engages wear plates 154, 154 mounted on the top and adjacent sides of the jaw members 114 and 120. The top portion 144 is offset upwardly between its inboard and outboard edges and extends between the jaw members 112 and 118, and the bottom portion 146 is offset downwardly intermediate its inboard and outboard edges and extends between the bottom jaw members 114 and 120 whereby the wear plate is maintained centered with respect to the inboard and outboard jaws. The wear plates slidably engage along generally flat surfaces whereby the brake head assembly is movable within the slots 126 and 128 radially toward and away from the wheel. The rear side of the hub 134 is provided with a slot 156 (Figures 9 and 10) widened as at 158 to accommodate the forward end of a link or strut 160 (Figure 4), said forward end of the link 160 being bifurcated and extending over the top and bottom of the bar 140 (Figure 6) within the recesses 162, 162 in the bearing 136 at the top and bottom of opening 138 therein. It will be noted that the link is accommodated limited rotational movement transversely of the brake head with respect to the brake head, the bar and the bearing inasmuch as the recesses 162, 162 are larger than the link. The brake head is connected to the bearing, the bar, and the link by a bolt 164 (Figure 3) which extends through the narrow portions 166, 166 at opposite ends of slot 156 in the hub 134 of the brake head through openings 167, 167 in the bearing (Figure 6), openings 168, 168 in the link, and opening 170 in the bar 140. Rotation of the head is resisted by friction elements 171, 171 frictionally engaging the hub 134, the shoes being urged into said engagement by a spring 172 which is compressed between one of the elements 171 and a nut 174 threaded on the bolt 164. It will be noted that the spring directly urges one element 171 against the hub, and the other element 171 is urged against the hub by the spring pressure which is transmitted through the bolt to the head 176 of the bolt against the other element 171.

The link 160 extends between the top and bottom portions of the wear plate 142 and at its rear end is bifurcated and extends above and below the outer end of the lever 94 and is connected thereto by a bolt 178 which also connects the top and bottom portions 144 and 146 of the plate 142 to said lever 94. It will be noted that the openings in the top and bottom portions 144 and 146 of the plate 142 through which the bolt 178 extends are oval-shaped and elongated transversely of the truck to accommodate limited movement of the link transversely of the truck as the brake head and shoe assembly is moved toward and away from the associated wheel.

The actuating means for the power devices 42 and 44 comprises a conventional pneumatic power unit comprising a cylinder 180 which may be mounted on the truck frame or associated car body. A piston 181 reciprocates in cylinder 180 and is connected to a stem 182 which projects from one end of the cylinder. The stem 182 is connected as at 184 to one end of a live lever 186. The other end of the lever 186 is connected as at 188 to a piston 190 extending into one end of a master hydraulic cylinder 192. The lever 186 is pivoted intermediate its ends as at 194 to one end of a pull rod 196, the opposite end of the pull rod being connected as at 198 to a link 200 intermediate the ends thereof, the opposite ends of the link 200 being connected as at 202 and 204 to the opposite ends of the air cylinder and hydraulic cylinder, respectively. The air cylinder is connected to an air conduit 206 of the associated car. The master cylinder is connected to a main line 208 which is connected to the branch lines 210, 210 connected to the conduits 86, 86 associated with the cylinders 78, 78 of the power devices 44, 44. The main line is also connected by branch lines 212, 212 to the conduits 52 of the power devices 42. The main line 208 is connected by a branch line 214 to an outlet port 216 (Figure 11) of an automatic slack adjuster generally indicated 218. The slack adjuster comprises an inlet port 220 which is connected to one end of a pneumatic pipe line 222, the other end of line 222 being connected to the cylinder 180 through a port 224.

In operation, air is supplied under pressure through the pipe 206 to the cylinder 180, causing the piston within the cylinder to move the piston stem to the right (Figure 1) whereby the lever is caused to pivot about point 194 in a clockwise direction to urge the piston 190 into the cylinder 192 whereby hydraulic fluid contained in cylinder 192 and the hydraulic lines is transmitted under pressure through the main line 208 and the branch lines 210 and 212. The fluid in lines 210 flows into cylinders 78 of the power devices 44 through the conduits 86. The piston 92 of each device 44 is caused to move toward the associated lever 94 whereby the lever is rotated in a direction urging its outer end toward the associated wheel. This movement of each lever 94 is transmitted to the associated brake head and shoe assembly by the link 160 whereby the brake shoe 132 is caused to engage the tread of the associated wheel 20. Simultaneously, the fluid in lines 212 flows into the power devices 42 whereby the pistons 48, 48 of each power device 42 are caused to move apart against the respective levers 56 and to rotate the same in directions engaging the shoes 75 of the brake head assemblies 74 against the associated rotor. It will be understood that the rotor-engaging brake means and the wheel-engaging means are actuated simultaneously.

To release the brakes, the air is exhausted in the cylinder 180 whereupon pressure in the hydraulic lines is caused to drop and the fluid is caused to flow from the power devices 42 and 44 through the hydraulic lines into the master cylinder. This action is attained by the release springs 76 which contract and cause the levers 56 to move in directions disengaging the shoes 75 from the related brake disk 22. Release means of each lever 56 also causes the associated piston 48 to move into the related cylinder 46. At the same time the pistons 92 are moved into respective cylinders 78 by relative movement of the levers 94 against the respective pistons in directions disengaging the wheel brake means. Each lever 94 is rotated to release position against the associated piston 92 by a release spring 223 which is connected at one end by bolt 225 to the inner end of lever 94 and secured at the other end by a bolt 226 to a bracket 228 which is preferably formed integral with the cover plate 82 of the associated housing. The inner end of each lever 94 projects through an opening 229 in the cover plate 82, said opening being closed by a flexible dust seal 231 sleeved over lever 94 and connected to the cover plate 82.

The return flow of fluid into the cylinder 192 upon release moves the piston 190 to the right (Figure 1) whereby the lever 186 will rotate in a counterclockwise direction and move the stem 182 and the piston 181 associated therewith into the cylinder 180.

The slack adjuster 218 is operative intermittently to adjust for wear, as hereinafter described, and comprises a body 230 which comprises a fluid reservoir 232 at its upper end containing hydraulic fluid. The top of the reservoir is covered by a plate 234 secured to the top of the body as by bolts 236. The cover plate 234 is provided with an air vent cap 238 which permits air to enter into the reservoir above the fluid therein. Beneath the reservoir the body 230 comprises a cylinder 240, the opposite ends of which are closed by end plates 242 and 244 secured to the body as by bolts 246 and 248, respectively. The plate 242 is provided with the before-mentioned port 220 which is connected to the pneumatic line 222. A piston generally designated 250 is disposed within the cylinder 240 in slidable fluid-tight engagement therewith and divides the cylinder into an air chamber 252 and a fluid chamber 254. A fixed sleeve 256 is mounted in chamber 252 preferably coaxial with cylinder 240 and connected at one end to the inner side of the cover plate 242. The sleeve 256 has a passage 258 therethrough communicating with port 220 at one end and through ports 259, 259 with chamber 252. The sleeve 256 is provided with an apertured abutment 260 intermediate its ends within passage 258.

A one-way valve is positioned in passage 258 between one side of abutment 260 and plate 242, said valve comprising a compression spring 262 seated at one end against one side of the abutment 260 and at the other end surrounding a shank 264 of a valve stem and seating at its other end against a head 266 connected to the shank, said spring 262 normally urging the stem to closed position, whereat the head 266 seats in a complementary resilient conical seat 268 attached to plate 242 around the inner end of port 220.

A slidable sleeve 270 is reciprocally mounted in passage 258 at the opposite side of abutment 260 in fluid-tight engagement with the fixed sleeve 256. The sleeve 270 in the neutral position of the piston 250 seats at one end against said opposite side of abutment 260 and is positioned across ports 272 and 274, closing the same. Port 272 communicates with the air chamber 252 and port 274 communicates with an exhaust line 275 which extends through cylinder 240 and is open to the atmosphere. Sleeve 270 is provided with apertured stops 276 and 278 at opposite ends. The sleeve 270 has a lost-motion connection with the head 280 of the piston 250, said connection comprising a bolt having a shank 282 threaded into the head 280 at one end and extending into the sleeve 270 through the aperture in stop 276. A head 284 is provided at the other end of the shank 282 and is movable between stops 276 and 278.

The head 280 of piston 250 carries a seal 286 in fluid-tight engagement with the cylinder 240. A skirt 288 is formed around the periphery of the head 280 and extends into the fluid chamber 254, said skirt having a port 290 registering with port 292 in cylinder 240. Port 290 communicates with chamber 254 and port 292 communicates with reservoir 232 whereby in the aligned position of ports 290 and 292 fluid is admitted into chamber 254 from the reservoir 232. The head 250 is urged to its neutral position as shown by a spring 294 under compression between and seated at one end against plate 244 and at the other end against the adjacent side of the piston head 280. The head 280 and plate 244 are provided with bosses 296 and 298 positioning respective ends of the spring 294.

The fluid chamber communicates through port 300 in plate 244 with the before-mentioned port 216 in a bonnet 302 connected to the external side of the plate 244. A one-way valve is mounted within the bonnet 302 and comprises a spring 304 compressed between a seat 306 on the bonnet and a head 308 of a valve stem, the spring normally urging the head 308 against a resilient, complementary, conical seat 310 on plate 244 around port 300 to close the port 300.

The slack adjuster operates after a predetermined movement of the piston 181 in the air cylinder takes place, opening port 224 in cylinder 180 (Figure 1) so that the air admitted under pressure in cylinder 180 is conducted through port 224 to the pneumatic line 222. This movement of piston 181 takes place after the brake shoes wear a predetermined amount. The high pressure air flows through port 220 unseating the head 266 of the valve stem, whereby the air flows through passage 258 and ports 259 into the air chamber 252. The pressure of the air in the air chamber 252 builds up and moves the piston 250 to the left until the port 290 is moved past port 292 when a state of equilibrium is reached. The fluid during braking application in chamber 254 will not unseat the head 308 inasmuch as a greater back pressure is exerted against the head 308 by the fluid in line 214 and port or passage 216. It will be noted that as soon as the pressures in chamber 252 and cylinder 180 reach equilibrium, the head 266 is urged to closed position by the spring 262. The compressed air is thus trapped in chamber 252. When the air cylinder 180 is exhausted, the fluid in the lines flows in return to cylinder 192; the back pressure against the head 308 is reduced to zero. Thereupon the compressed air in chamber 252 moves the piston 250 to the left, exhausting the fluid in chamber 254 under pressure through ports 300 and 216 into the branch line 214, line 208 into the cylinder 192, by unseating the head 308 and moving it to open position. The movement of piston 250 continues until the head 284 engages stop 276 and moves the sleeve 270 to the left to a position opening ports 272 and 274 to line 275, whereby the air is exhausted to the atmosphere. The pressure on the fluid in chamber 254 is relieved; the head 308 is urged by spring 304 to closed position against seat 310, closing port 300. The piston 250 is moved to the right by spring 294. During this movement of piston 250 the fluid flows into chamber 254 from reservoir 232 through a one-way valve 312. After certain movement of the piston 250, the head 284 engages stop 278 on sleeve 270, the sleeve being moved to the right until it closes ports 272 and 274 and seats against the abutment 260 and thereby preventing further movement of piston 250 to the right. The slack adjuster is now ready to repeat the cycle when another adjustment is required.

A handbrake arrangement is provided for the wheel-engaging brake means and comprises an equalizer 314 (Figure 4) connected at opposite ends by bolts 225 to the inner ends of levers 94 of the brake means associated with the same wheel and axle assembly. The equalizer is connected as at 316 intermediate its ends to one end of a cable 318 which passes around a pulley 320 mounted on a bracket 322 which is connected to the adjacent transom 8. The other end of the cable is connected to any conventional operating means, as will be readily understood by those skilled in the art.

In operation, the last-mentioned end of the cable is pulled to the right (Figure 4) whereby its one end and equalizer 314 is moved to the left and in turn rotating the levers 94 connected thereto in brake-applying directions to apply the shoes against respective wheels 20. Upon release, the parts move in reverse directions by release springs 223.

We claim:

1. In a brake arrangement for a railway car truck comprising a fame and a wheel and axle assembly, a brake structure comprising a demountable support connected to said frame, wheel tread engaging brake means carried by the support, said wheel tread engaging brake means including a guide carried by said support, wheel-engaging friction means movable toward and away from the wheel, power means carried by the support, an operative connection between the power means and said friction means including a link connected at one end to said friction means and operatively connected at the other end to said power means, and a friction plate movable with the link and friction means and interposed between the same and said guide and in slidable engagement with the latter.

2. In a brake arrangement for a truck comprising a frame and a wheel and axle assembly, a demountable support connected to the frame, wheel tread engaging brake means carried by the support and comprising a guide connected to the frame and support, mounting means slidably carried by said guide, friction means pivoted on said mounting means in alignment with said wheel, said friction means and mounting means being movable toward and away from said wheel for engaging and disengaging said friction means with respect thereto, a substantially horizontal lever pivoted intermediate its ends to said support and operatively connected at one end to said mounting means, and a power device carried by said support comprising a piston engaging said lever adjacent the opposite end thereof for rotating said lever in a direction applying said friction means against the wheel.

3. In a brake arrangement, an assembly comprising a brake head, a brake shoe carried thereby, a sleeve on the head, a trunnion member extending through the sleeve affording a rotatable mounting for the head, a bar extending through a complementary opening in said member and projecting at opposite ends beyond the opposite sides of the head to afford a slidable mounting for the head on an associated support, a power-transmitting link extending at one end through an opening in the sleeve, and a bolt extending through openings in the sleeve, bar and link connecting the same, said opening in the sleeve being elongated circumferentially of the sleeve to accommodate rotation of the head on said trunnion member.

4. In a brake arrangement for a railway car truck comprising a frame and a wheel and axle assembly, a brake structure comprising a demountable support connected to said frame, wheel tread engaging brake means carried by the support, said tread engaging brake means including a guide connected to the support and having spaced jaws open toward the wheel, a brake head, a shoe on the head engageable with the tread of the wheel, and means slidably mounted within said jaws and affording a pivotal mounting for said head between said jaws, said head and shoe and means being slidable toward and away from said wheel.

5. In a brake arrangement for a railway truck comprising a wheel and axle assembly including a wheel and a brake disk rotatable therewith, wheel-engaging and disk-engaging brake means, a housing demountably attached to the truck offering support for both of said brake means, an hydraulic power unit associated with each of said brake means, said housing affording support for both of said power units, a master hydraulic power device, conduit means connecting said device with said units for conducting fluid from the former to the latter upon actuation of the former, and a pneumatic energizing source operatively connected to said device for actuation thereof.

6. In a brake arrangement for a railway car truck comprising a frame and a wheel and axle assembly, a brake structure including a demountable support mounted on the frame, wheel tread engaging brake means carried by the support, said wheel tread engaging brake means including a guide connected to said support in alignment with said wheel longitudinally of the truck, friction means slidably mounted on the support for movement toward and away from the wheel, and power means carried by the support operatively connected to said friction means for actuation thereof.

7. In a brake arrangement for a railway car truck comprising a frame and a supporting wheel and axle assembly including a brake disk and spaced wheels, a vertically adjustable brake package including a support adjustably mounted on said frame, said package comprising wheel-engaging and disk-engaging brake means, and a torque arm for said wheel-engaging friction means carried by the truck and in slidable engagement with said support to accommodate vertical adjustment thereof.

8. In a brake arrangement for a railway car truck, a wheel, a friction disk, said wheel and said disk being rotatable on an axle, a frame, a plurality of torque arms fixedly secured to the frame, a housing, an adjustable connection between the housing and some of said torque arms, a guide fixedly secured to the housing and slidably supported by at least one other of said torque arms, wheel brake means carried by the housing adjacent the wheel, off-wheel brake means carried by the housing adjacent the disk, hydraulic power cylinders carried by the housing and operatively associated with the related brake means, a pneumatic power source, and means connecting said source to said cylinders whereby said source simultaneously actuates said cylinders.

9. In a brake arrangement for a railway car truck, a wheel and disk affixed to an axle to rotate therewith, a frame, a package brake unit demountably carried by the frame adjacent the wheel and disk, said unit comprising a housing, wheel and off-wheel brake means carried by the housing and cooperating with the wheel tread and disk, respectively, hydraulic power devices carried by the housing and operatively connected to the related brake means, a master hydraulic power device, conduit means connecting said master device to said power device, pneumatic energizing means connected to the master device and operative to actuate same and thereby produce coordinated actuation of said wheel brake means and off-wheel brake means.

References Cited in the file of this patent

UNITED STATES PATENTS

| Number | Name | Date |
|---|---|---|
| 283,368 | Barratt | Aug. 21, 1883 |
| 1,907,174 | Blair | May 2, 1933 |
| 1,979,644 | Saito | Nov. 6, 1934 |
| 2,051,967 | Saito et al. | Aug. 25, 1936 |
| 2,201,571 | Aikman | May 21, 1940 |
| 2,254,513 | Busse | Sept. 2, 1941 |
| 2,295,244 | Tack | Sept. 8, 1942 |
| 2,352,222 | Pogue et al. | June 27, 1944 |
| 2,357,263 | Ledwinka | Aug. 29, 1944 |
| 2,359,081 | Blomberg | Sept. 26, 1944 |
| 2,359,805 | Tack | Oct. 10, 1944 |
| 2,496,250 | Light | Jan. 31, 1950 |
| 2,511,336 | Hudson | June 13, 1950 |